E. G. WAYMAN.

IGNITOR FOR INTERNAL COMBUSTION ENGINES.

APPLICATION FILED AUG. 22, 1916.

Reissued Oct. 3, 1916.

14,197.

2 SHEETS—SHEET 1.

Witnesses

Francis J. Donovan

Robert H. Kohl

Inventor:

Edmund G. Wayman by Christy and Christy his attorneys

THE NORRIS PETERS CO., PHOTO-LITHO., WASHINGTON, D. C.

E. G. WAYMAN.

IGNITOR FOR INTERNAL COMBUSTION ENGINES.

APPLICATION FILED AUG. 22, 1916.

Reissued Oct. 3, 1916.

14,197.

2 SHEETS—SHEET 2.

Witnesses

Francis J. Tomasson

Robert H. Kohl

Inventor:

Samuel G. Wayman by Christy and Christy his attorneys

THE NORRIS PETERS CO., PHOTO-LITHO., WASHINGTON, D. C.

UNITED STATES PATENT OFFICE.

EDMUND G. WAYMAN, OF SWISSVALE, PENNSYLVANIA, ASSIGNOR TO WAYMAN-AIKEN ELECTRIC & MANUFACTURING COMPANY, INCORPORATED, OF WILKINSBURG, PENNSYLVANIA, A CORPORATION OF PENNSYLVANIA.

IGNITOR FOR INTERNAL-COMBUSTION ENGINES.

14,197. Specification of Reissued Letters Patent. Reissued Oct. 3, 1916.

Original No. 1,185,030, dated May 30, 1916, Serial No. 828,850, filed April 1, 1914. Application for reissue filed August 22, 1916. Serial No. 116,405.

*To all whom it may concern:*

Be it known that I, EDMUND G. WAYMAN, a citizen of the United States, residing at Swissvale, in the county of Allegheny and State of Pennsylvania, have invented certain new and useful Improvements in Ignitors for Internal-Combustion Engines, of which the following is a specification, reference being had to the accompanying drawings.

This invention relates to improvements in ignitors for internal combustion engines, and more particularly to that class of ignitors of the make and break type.

An object of this invention is the provision of an ignitor of the make and break type in which one or both of the ignitors of the electrodes may be slidably mounted in the ignitor plug, so that upon compression in the engine cylinder, the circuit is broken by moving one of the electrodes away from the other.

Another object of this invention is the provision of an ignitor of this character, which is simple in construction, whereby it may be cheaply manufactured, and one which will be very efficient in use.

Figure 1:
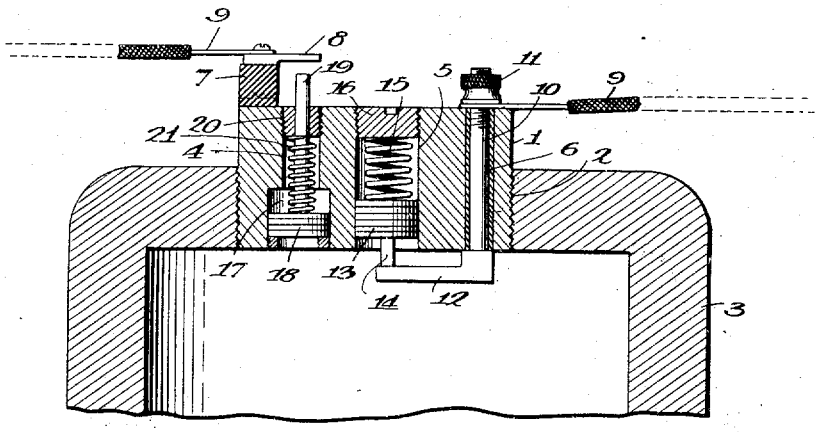

With these and other objects in view, my invention consists in the novel construction, combination, and arrangement of parts to be hereinafter more fully described, claimed, and illustrated in the accompanying drawings, in which, Figure 1 is a vertical sectional view of the preferred form of my ignitor, showing the same connected in a cylinder of an engine; and Figs. 2, 3, 4, and 5, are vertical sectional views of alternative forms of my device.

Referring more particularly to the drawings, the preferred embodiment of my ignitor consists of a plug 1 which is adapted for engagement in an opening 2 in an engine cylinder 3, the plug having a plurality of bores extending therethrough designated by the numerals 4, 5, and 6. Mounted on the outer end wall of the plug 1 is a block 7 which is composed of fiber or other non-conducting material, and mounted on the plug is a contact plate 8, the free end of which is disposed in alinement with the bore 4 in the plug, one of the lead wires 9 of the circuit being connected to the contact plate 8. Disposed in and insulated from the bore 6 is a conducting rod 10, the outer end of which is threaded for the reception of a nut 11, which connects the other lead wire 9 of the circuit to the rod 10, and connected to the inner end of the rod is a stationary electrode 12, the extremity of which is disposed below the bore 5 in the plug. Slidably mounted in the bore 5 and in electric contact with the walls of the bore is a plunger 13 to the lower end of which is connected the movable electrode 14 which is normally adapted to rest upon the electrode 12. To maintain the plunger in the lower end of the bore, an expansion spring 15 is mounted in the bore, the lower end of the spring bearing against the plunger 13, the upper end of the spring engaging a plug 16 which closes the upper end of the bore. The bore 4 is enlarged adjacent its lower end to form a chamber 17 in which a plunger 18 is mounted for reciprocation, and projecting upwardly from the plunger is a contact rod 19, the upper end of which projects outwardly through a plug 20 in the upper end of the bore 4 below the contact plate 8. This plunger also moves in electric contact with the walls of the bore. A spring 21 which is of less tension than the spring 15 is also mounted in the bore 4 to normally force the plunger 18 downwardly to maintain the upper end of the contact rod 19 spaced from the contact plate 8.

The operation of the preferred form of my device is as follows: Upon the compression stroke of the piston, (not shown), in the cylinder 3 of the engine, the compression forces the plunger 18 outwardly so that the rod 19 engages the plate 8 to allow the circuit to pass through the plug, and as the compression in the cylinder becomes greater, the plunger 13 is moved outwardly in the bore 5 against the action of the spring 15 which is of greater tension than the spring 21, thereby moving the electrode 14 away from the stationary electrode 12, to create a spark in the usual manner and explode the mixture in the cylinder 3. It will be understood that as the piston makes its stroke in the cylinder of the engine, the compression is relieved, the plungers 13 and 18 return to their normal positions, and the circuit through the plug is broken. Electric contact between the plungers 13 and 18 and the body of plug 1 may, if desired, be chiefly or wholly maintained through springs 15 and 21.

Figure 2:
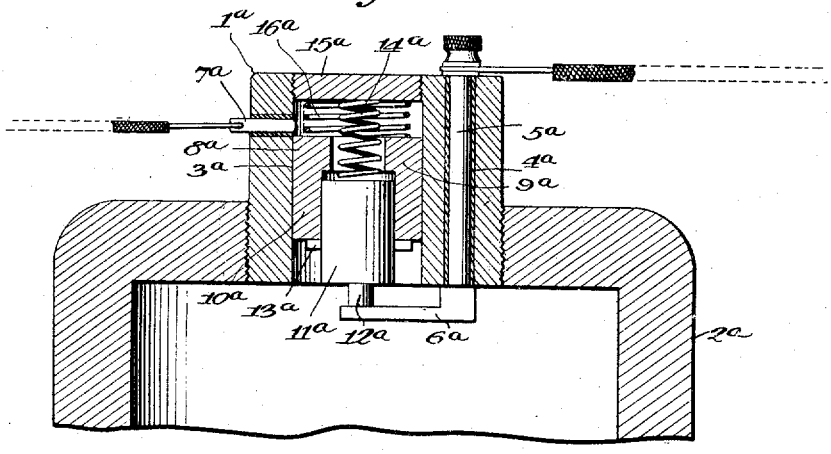

In Fig. 2 of the drawings, I have illustrated a modified form of my invention, in which the plug $1^a$ is inserted in the cylinder $2^a$ of the engine in the ordinary manner, the plug in this form being provided with only two bores $3^a$ and $4^a$, the bore $3^a$ being of relatively greater diameter than the bore $4^a$. A conducting rod $5^a$ is disposed in and insulated from the walls of the bore $4^a$ and is connected to one of the lead wires in the usual manner at its outer end, the inner end of the rod carrying the stationary electrode $6^a$, the end of which is disposed below the bore $3^a$. A contact plate $7^a$ extends through the wall of the plug near its outer end, the inner end of the pin extending into the bore $3^a$ and the outer end thereof being connected to the other lead wire of the circuit. This contact plate $7^a$ is insulated in its passage through the wall of the plug. Slidably mounted within the bore $3^a$ and in electric continuity with the walls of the bore is a plunger $8^a$ which is provided with a central opening $9^a$ and a depending peripheral flange $10^a$, and in electric continuity with the body of the flange and disposed within the flange $10^a$ is the upper end of a plunger $11^a$, the lower end of which extends below the lower extremity of the flange $10^a$, and connected to the lower end of the plunger $11^a$ is a depending electrode $12^a$ which is normally adapted to engage the electrode $6^a$. The plunger $11^a$ is provided with a pair of laterally extending lugs $13^a$ to limit downward movement of the flange $10^a$. To normally hold the plungers in their lowermost positions, a spring $14^a$ is disposed through the opening $9^a$ in the plunger $8^a$, the lower end of the spring engaging the upper end of the plunger $11^a$, and the upper end of the spring $14^a$ engaging the under face of a plug $15^a$ which closes the upper end of the bore $3^a$. A similar spring $16^a$ engages the upper end of the plunger $10^a$ and the under face of the plug $15^a$, the spring $16^a$ being of relatively weaker tension than the spring $14^a$, and normally holding the plunger $10^a$ downwardly against the lugs $13^a$ of the plunger $11^a$. As in the structure of Fig. 1, electric continuity between the plungers and the body of the plug may, if desired, be established through, and if preferred solely through, these springs. When compression is formed in the cylinder $2^a$, the plunger $10^a$ is moved upwardly against the action of the spring $16^a$ so that the same engages the contact pin $7^a$ to allow the circuit to pass through the plug, and upon greater compression in the cylinder, the piston or plunger $11^a$ is moved upwardly against the action of the spring $14^a$ to disengage the electrode $12^a$ from the electrode $6^a$ and thereby create a spark which explodes the mixture in the cylinder.

Figure 3:
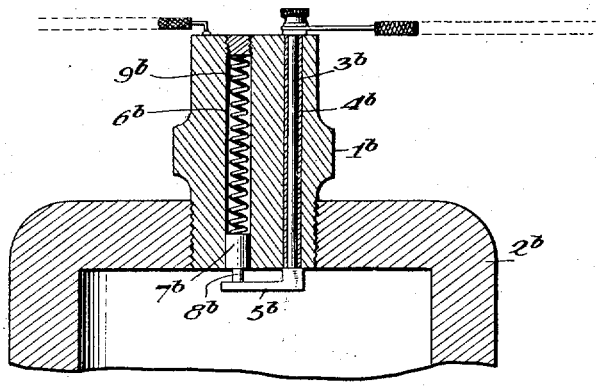

In Fig. 3 of the drawing, I have shown still another form of my device in which a stationary electrode and a movable electrode are employed, and in this form, the plug $1^b$ is inserted in the cylinder $2^b$, and the conducting rod $3^b$ is mounted in and insulated from the bore $4^b$, the lower end of the rod carrying an electrode $5^b$, the end of which is disposed below a second bore $6^b$ formed in the plug. A plunger or piston $7^b$ is disposed in the lower end of the bore $6^b$, the plunger carrying the electrode $8^b$ upon its lower face, which is normally engaged upon the electrode $5^b$. A spring $9^b$ engages the upper end of the plunger $7^b$ to normally force the same downwardly within the bore $6^b$ and, in this form of the device, the circuit is normally closed, and upon compression in the cylinder, the plunger $7^b$ is moved upwardly to space the electrode $8^b$ from the electrode $5^b$ and thereby cause a spark to explode the mixture in the cylinder $2^b$.

Figure 4:
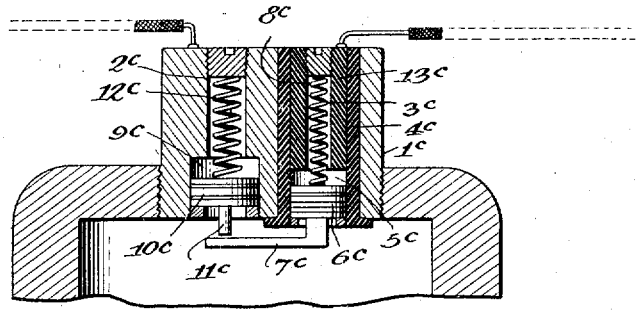

In Fig. 4 of the drawings, I have illustrated still another form of my device in which both of the electrodes are movable. In this form of my device, the plug $1^c$ is provided with two bores $2^c$ and $3^c$, the bore $3^c$ having an insulating bushing $4^c$ mounted therein, and within such insulated bushing a conducting bushing $13^c$, the bore being enlarged at its lower end to form a chamber $5^c$. A plunger $6^c$ is mounted in the chamber, which has an electrode $7^c$ connected to its lower end, the free end of the electrode being disposed below the bore $2^c$. A spring $8^c$ is provided to normally maintain the plunger $6^c$ in its lower position in the chamber $5^c$, and the lower end of the bore $2^c$ is also enlarged at its lower end to provide a chamber $9^c$, the upper wall of the chamber $9^c$ being disposed above the upper wall of the chamber $5^c$. A plunger $10^c$ is also mounted in the chamber $9^c$, the plunger carrying on its lower end a depending electrode $11^c$, and the plunger $10^c$ is forced downwardly against the lower wall of the chamber $9^c$ by the action of the expansion spring $12^c$. The lowermost extremity of the electrode $11^c$ is normally spaced from the electrode $7^c$ substantially the same distance as the space between the upper end of the plunger $6^c$ and the upper wall of the chamber $5^c$, and the spring $12^c$ is of slightly greater tension than the spring $8^c$, so that upon compression in the cylinder, the plunger $6^c$ will first be moved upwardly to engage the electrode $7^c$ with the electrode $11^c$ and to make the circuit between the electrodes. When the plunger $6^c$ is in this position, with its upper end engaged against the upper wall of the chamber $5^c$, the upward movement thereof is limited, and upon greater compression in the cylinder, the plunger $10^c$ is moved upwardly in its chamber $9^c$ to break the circuit between the electrodes and cause a spark to explode the mixture in the cylinder.

Figure 5:
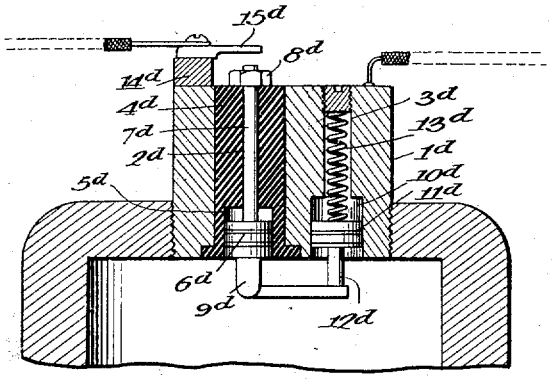

In Fig. 5 of the drawings, I have shown another manner of constructing my ignitor in which both electrodes are movable, and in this form, the plug $1^d$ is provided with a pair of bores $2^d$ and $3^d$, and mounted in the bore $2^d$ is an insulating bushing $4^d$, the bore of the bushing being enlarged at its lower end as at $5^d$ to form a chamber for the reception of a plunger $6^d$ to the upper end of which a conducting rod $7^d$ is connected, the conducting rod projecting above the upper end of the plug and having a nut $8^d$ mounted thereon to limit the downward movement of the plunger. An electrode $9^d$ is carried by the lower end of the plunger $6^d$, the electrode being offset and having its extremity disposed below the bore $3^d$. The lower end of the bore $3^d$ is enlarged to provide a chamber $10^d$, in which a plunger $11^d$ is mounted, the lower end of the plunger having an electrode $12^d$ formed thereon which normally rests upon the electrode $9^d$ carried by the plunger $6^d$. The electrode $12^d$ is normally maintained in engagement with the electrode $9^d$ by reason of the expansion spring $13^d$ which bears at its lower end against the upper face of the plunger $11^d$, and the upper wall of the chamber $10^d$ is disposed above the upper wall of the chamber $5^d$ in the bore of the opening $4^d$. A block $14^d$ is connected to the upper end of the plug $1^d$, the block carrying a contact plate $15^d$ which is disposed above the rod $7^d$ and normally spaced from the upper end thereof.

The operation of this form of my device is as follows: Upon compression in the cylinder, the piston $6^d$ is moved upwardly until the upper extremity of the conducting rod $7^d$ engages the contact plate $15^d$ whereupon the circuit between the electrode is made, and upon greater compression in the cylinder, the plunger $11^d$ is moved upwardly above the plunger $6^d$ thereby breaking the circuit between the electrodes and causing a spark to explode the mixture in the cylinder.

Having thus fully described my invention, what I desire to secure and claim by Letters Patent, is:—

1. In an ignitor for internal combustion engines the combination of a cylinder, two motor elements arranged in the wall of said cylinder and movable therein in response to changes in pneumatic pressure within said cylinder, means limiting the traverse of one of said motor elements while the other remains movable, and a sparking device operated after the movement of one of the movable elements is arrested and by the movement of the other element.

2. In an ignitor for internal combustion engines the combination with the engine cylinder of two bores formed in the wall of said cylinder and opening into the cylinder chamber, a motor element in each bore and movable therein under pneumatic pressure, the range of movement of one of said motor elements being greater than that of the other, and a sparking device operated by the traverse of the motor element having the greater range of movement.

3. In an ignitor for internal combustion engines the combination with the cylinder of the engine of three bores formed in the cylinder wall, a stationary electrode mounted in one of said bores and having its extremity disposed in alinement with an adjacent bore, a plunger carrying an electrode, said plunger being slidably mounted in said adjacent bore, means yieldingly urging the plunger outward to bring its electrode against said stationary electrode, a stationary contact carried by the cylinder wall in alinement with the third of said bores, a plunger mounted in said third bore and having a movable contact connected thereto, and a spring mounted in the said third bore for engagement against the last mentioned plunger to maintain the movable contact in spaced relation from the stationary contact, as and for the purpose described.

4. In an ignitor for internal combustion engines the combination with the cylinder of the engine of a pair of bores formed in the cylinder wall, a conducting rod mounted in one of said bores, an electrode carried by one end of said conducting rod and having its free end disposed in alinement with the other of said bores, a stationary contact projecting through the cylinder wall and into the other of said bores, a movable contact mounted in the other of said bores, a spring disposed in the other of said bores to engage said movable contact and maintain the same in spaced relation from the stationary contact, a plunger slidably mounted in the other of said bores and carrying an electrode on one end thereof for normal engagement with the first mentioned electrode, and a second spring mounted in said other bore for engagement against said plunger to normally hold the movable electrode against said stationary electrode, as and for the purpose described.

5. In an ignitor for internal combustion engines the combination with the cylinder of the engine of a pair of bores formed in the cylinder wall, an insulating bushing mounted in one of said bores, the bore of said bushing being enlarged at one end to form a chamber, a plunger slidably mounted in said chamber, an electrode carried by one end of said plunger, the free end of said electrode being disposed in alinement with the other of said bores, a spring mounted in the bore of said bushing to engage the plunger and normally maintain the same in its lowermost position in the chamber, the other of said bores being enlarged at its lower end to form a chamber, a plunger slidably mounted in the last mentioned chamber and having a depending contact disposed in alinement with the free end of the first mentioned contact and normally spaced therefrom, and a spring mounted in the other of said bores for engagement against the last mentioned plunger to normally maintain the same in its lowermost position, the last mentioned spring being of slightly greater tension than the first mentioned spring, as and for the purpose described.

6. In an ignitor for internal combustion engines the combination with the cylinder wall of a bore in said wall opening into the cylinder chamber, a stationary contact piece extending into said bore, two members movable within said bore in response to pneumatic pressure in the cylinder and moving in succession as such pneumatic pressure increases, one of said movable members forming with said stationary contact piece a make-and-break device in an electric circuit and the other of the two said movable members bearing an electrode, and a second electrode borne by said cylinder wall with which electrode the electrode borne by the movable member as aforesaid is normally in contact.

In testimony whereof I hereunto affix my signature in the presence of two witnesses.

EDMUND G. WAYMAN.

Witnesses:

JOHN J. WALKER,
JAMES L. SHEEKEY.

Copies of this patent may be obtained for five cents each, by addressing the "Commissioner of Patents, Washington, D. C."